(12) United States Patent
    Boulton

(10) Patent No.: US 9,828,061 B2
(45) Date of Patent: Nov. 28, 2017

(54) CONTINUOUSLY VARIABLE TRANSMISSION ON A MOTORCYCLE

(71) Applicant: Radia M92 Inc., North Canton, OH (US)

(72) Inventor: Charles Mitchell Boulton, North Canton, OH (US)

(73) Assignee: Radial Engine Innovations Holding LLC, North Canton, OH (US)

( * ) Notice: Subject to any disclaimer, the term of this patent is extended or adjusted under 35 U.S.C. 154(b) by 0 days.

(21) Appl. No.: 15/231,856

(22) Filed: Aug. 9, 2016

(65) Prior Publication Data

US 2016/0347413 A1 Dec. 1, 2016

Related U.S. Application Data

(63) Continuation of application No. 14/832,076, filed on Aug. 21, 2015, now Pat. No. 9,463,847.

(60) Provisional application No. 62/041,369, filed on Aug. 25, 2014.

(51) Int. Cl.
| | |
|---|---|
| *B62M 11/10* | (2006.01) |
| *B62M 11/12* | (2006.01) |
| *B62M 9/06* | (2006.01) |
| *B62M 7/02* | (2006.01) |
| *B62K 11/04* | (2006.01) |
| *F16H 3/76* | (2006.01) |
| *F16H 3/42* | (2006.01) |

(52) U.S. Cl.
CPC .............. *B62M 11/10* (2013.01); *B62K 11/04* (2013.01); *B62M 7/02* (2013.01); *B62M 9/06* (2013.01); *B62M 11/12* (2013.01); *F16H 3/423* (2013.01); *F16H 3/76* (2013.01)

(58) Field of Classification Search
CPC ............ B62M 7/02; B62M 7/06; B62K 11/04
See application file for complete search history.

(56) References Cited

U.S. PATENT DOCUMENTS

| | | | |
|---|---|---|---|
| 4,727,794 A | 3/1988 | Kmicikiewicz | |
| 5,121,936 A | 6/1992 | Cowan | |
| D434,047 S | 11/2000 | Ballentine | |
| 6,230,836 B1 | 5/2001 | Cowan | |
| 6,769,384 B2 | 8/2004 | Dougherty | |
| 7,849,949 B2 * | 12/2010 | Arnold .................. | B62K 11/04 180/227 |
| 8,215,439 B2 | 7/2012 | Sugitani et al. | |
| 8,347,993 B2 | 1/2013 | Ishida | |
| 8,407,995 B2 | 4/2013 | Cho et al. | |
| 8,494,728 B2 | 7/2013 | Unno | |
| 8,696,499 B2 | 4/2014 | Ishida et al. | |
| 2003/0005894 A1 | 1/2003 | Dougherty | |
| 2007/0163831 A1 | 7/2007 | Stevens | |

(Continued)

*Primary Examiner* — Kevin Hurley
(74) *Attorney, Agent, or Firm* — Sand & Sebolt

(57) ABSTRACT

Provided is a continuous variable transmission for a motorcycle having a radial engine, the transmission including a cone shaped gear, a driveshaft received in one end of the cone shaped gear, a gear plate having an angled geared surface configured to mate with the cone shaped gear, a drive clutch, a crank shaft extending through the drive clutch, and a plurality of fingers secured to the drive clutch and configured to move from a first position to a second position wherein the fingers are in a first position at a first speed and the fingers are at a second position, at a second speed.

20 Claims, 11 Drawing Sheets

(56) References Cited

U.S. PATENT DOCUMENTS

2007/0272466 A1 11/2007 Levey
2014/0296008 A1 10/2014 Wu
2014/0315670 A1 10/2014 Mariotti et al.

* cited by examiner

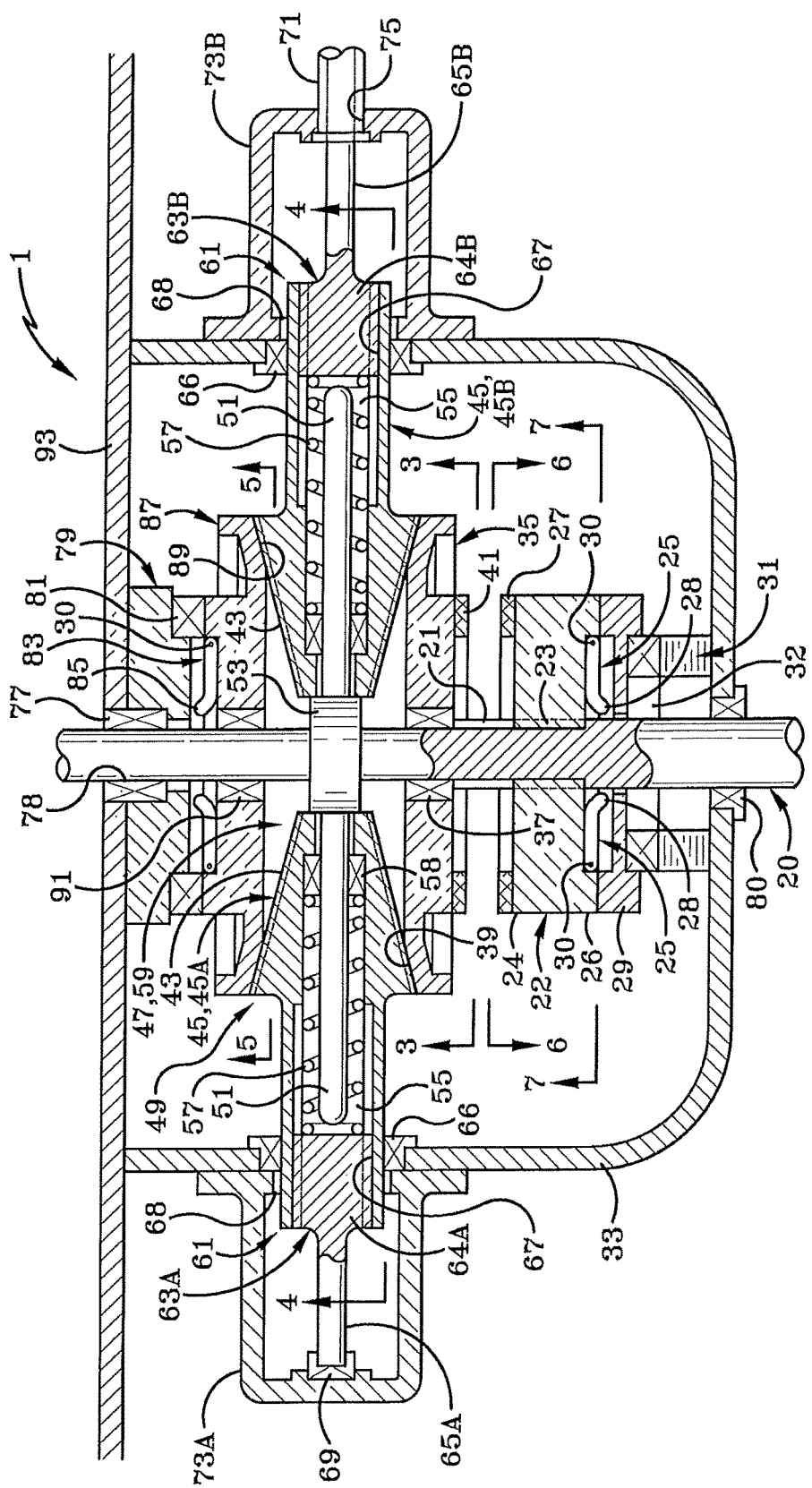

CONTINUOUSLY VARIABLE TRANSMISSION ON A MOTORCYCLE

CROSS-REFERENCE TO RELATED APPLICATION

This application is a continuation of prior U.S. patent application Ser. No. 14/832,076, filed on Aug. 21, 2015, which claims priority from U.S. Provisional Application Ser. No. 62/041,369, filed Aug. 25, 2014, the disclosure of which is incorporated herein by reference.

BACKGROUND

Technical Field

The present disclosure relates to a transmission system for an engine. More particularly, the present disclosure relates to a continuously variable transmission system for use with a motorcycle. Specifically, the present disclosure relates to the use of a conical roller coupled with centrifugal gear to provide a continuously variable transmission system for a motorcycle having a radial engine.

Background Information

A continuously variable transmission is a transmission that can change seamlessly through an infinite number of effective gear ratios between maximum and minimum values. This contrasts with other mechanical transmissions that offer a fixed number of gear ratios. The flexibility of a continuously variable transmission allows the input shaft to maintain a constant angular velocity.

Providing a continuously variable transmission system on a motorcycle has proved difficult due to the tight tolerances and small area in which to work, given the smaller overall size of the motorcycle. The previous attempts have been further complicated by the use of standard style engines on the motorcycle, for example a "v-twin" style configuration of the pistons.

Others have attempted to utilize a radial engine on a motorcycle. For example, US Pat. App. Pub. 2007/0163831 discloses a motorcycle having a radial engine which allows airflow over more cylinders having more surface area to make engine cooling more efficient. However, this application makes no mention nor does it event teach or suggest a solution as to the complexity required to connect a transmission to the radial engine on a motorcycle.

BRIEF SUMMARY

Issues continue to exist transmissions for motorcycles, thus a need exists for an improved transmission on a motorcycle having a radial engine. The present disclosure addresses these and other issues.

In one aspect, an embodiment of the present disclosure may provide a machine comprising: a motorcycle including a frame and ground engaging wheels; a radial engine supported by the frame to power at least one of the ground engaging wheels; and a continuously variable transmission supported by the frame and coupled to the radial engine providing a plurality of effective gear ratios.

In one aspect, the disclosure may provide a continuously variable transmission comprising: a cone shaped gear having a first end and a second end; a driveshaft received in the second end of the cone shaped gear; a gear plate having an angled geared surface configured to mate with the cone shaped gear; a drive clutch, wherein the drive clutch is movable from a rest position to an abutting position, whereby the drive clutch does not abut the gear plate in the rest position, and wherein the drive clutch abuts the gear plate in the abutting position; a crank shaft extending through the drive clutch and configured to axially rotate the drive clutch at least at a first speed and a second speed; and a plurality of fingers secured to the drive clutch and configured to move from a first position to a second position, wherein the fingers are in the first position and the first speed, and wherein the fingers are at the second position at the second speed.

In another aspect, an embodiment of the disclosure may provide a continuous variable transmission for a motorcycle including a cone shaped gear, a driveshaft received in one end of the cone shaped gear, a gear plate having an angled geared surface configured to mate with the cone shaped gear, a drive clutch, a crank shaft extending through the drive clutch, and a plurality of fingers secured to the drive clutch and configured to move from a first position to a second position wherein the fingers are in a first position at a first speed and the fingers are at a second position, at a second speed.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the disclosure.

The accompanying drawings, which are incorporated in and constitute a part of the specification, illustrate various example methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2 is a cross-sectional view of one embodiment of the transmission of the present disclosure taken along line 2-2 of FIG. 1;

Similar numbers refer to similar parts throughout the drawings.

DETAILED DESCRIPTION

A continuously variable transmission is shown in FIGS. 1-11 and referred to generally herein as transmission 1. Various non-novel features found in the prior art relating to transmissions are not discussed herein. The reader will readily understand the fundamentals of transmissions, motorcycles, and radial engines are well within the prior art and readily understood by one familiar therewith.

Figure 1:
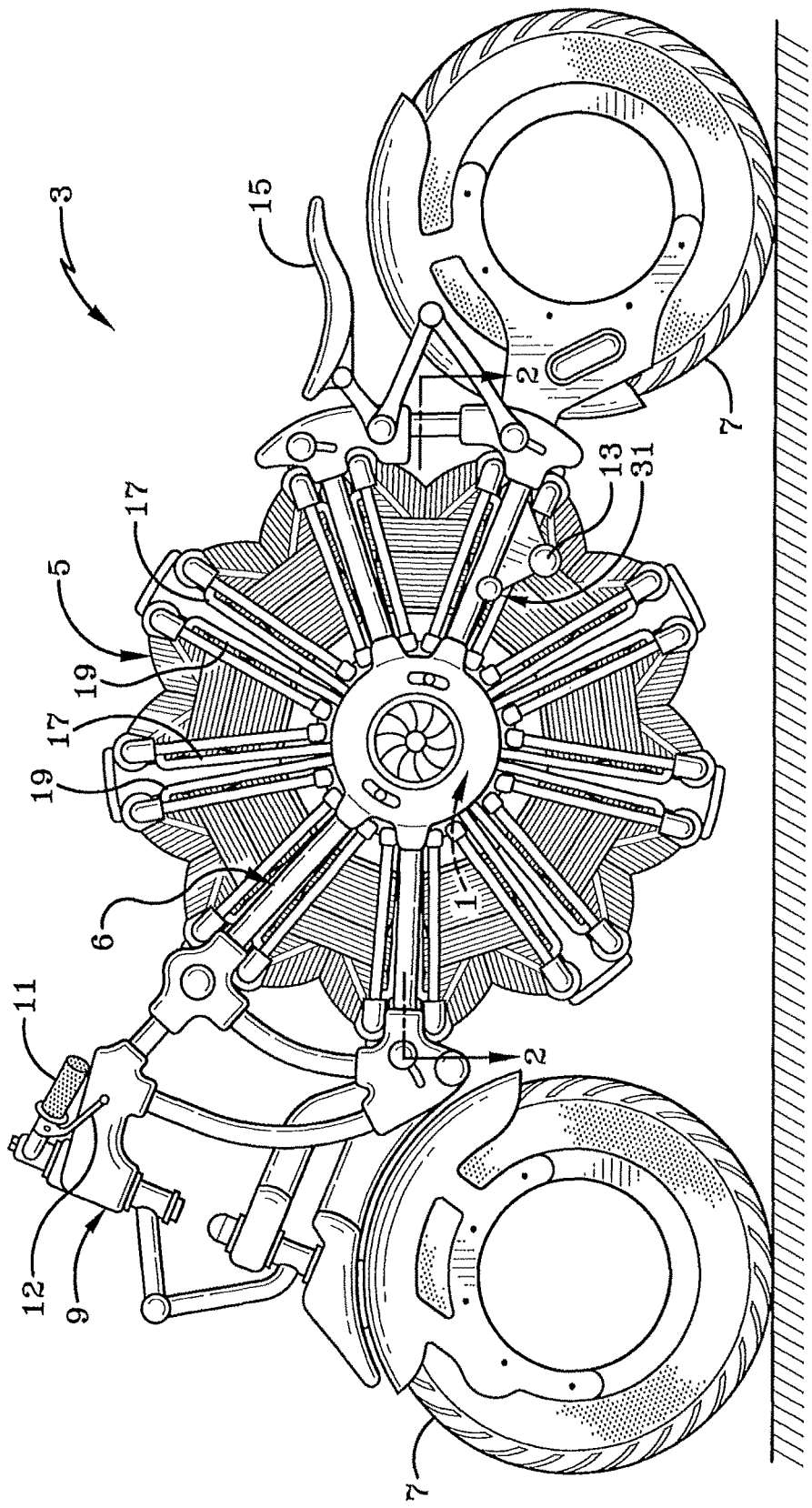
FIG. 1 is a side elevational view of a motorcycle having a transmission of the present disclosure.

As shown in FIG. 1, one embodiment of transmission 1 may be for use in a motorcycle 3 having a radial engine 5. Motorcycle 3 includes a frame 6, a set of ground engaging wheels 7, and a steering mechanism 9. Frame 6 supports radial engine 5 via a generally rigid connection and supports continuously variable transmission 1. Wheels 7 may be a hubless configuration. Steering mechanism 9 may further include a throttle 11 for actuating radial engine 5 and a clutch lever 12 for actuating an element, such as a clutch, in transmission 1. Motorcycle 3 further includes a foot peg 13 for resting a user's foot and a saddle or seat 15 for resting a user's body. Radial engine 5 includes a series of air intake tubes 19 for receiving fresh air into engine 5 and a series of air exhaust tubes 17 for expelling exhaust air out of engine 5.

As shown in cross-section in FIG. 2, transmission 1 that is attached to engine 5 may provide a crankshaft 20, a drive clutch 22, fingers 25, an abutment plate 29, shifting linkage 31, a gear 35 having an angled surface 39, a clutch pad 41, a cone gear 45, a stabilizing rod 51, and a sleeve 53. Crankshaft 20 connects radial engine 5 to transmission 1. Crankshaft 20 has a series of axially extending splines 21 for connecting with complementary splines 23 on a drive clutch 22. Drive clutch 22 is concentric with crankshaft 20 and extends from an inner portion 24 to an outer portion 26 and includes a series of outwardly extending fingers 25 proximate outer portion 26. Fingers 25 are shown in a first position in FIG. 2. Drive clutch 22 further includes a clutch pad 27 proximate inner portion 24. An abutment plate 29 is positioned concentrically around crankshaft 20 and oriented to abut drive clutch 22 at outer portion 26 and a tip 28 of each finger 25. Fingers 25 are connected to clutch 22 via pivot connection 30. Abutment plate 29 is connected to the shifting linkage 31 via bearing 32. The shifting linkage 31 moves from a first position (FIG. 2) to a second position (FIG. 8) to drive clutch 22 with transmission 1. As shown in FIG. 2, a casing 33 encloses the shifting linkage 31, transmission 1, and a portion of the crankshaft 20.

As shown in FIG. 2, transmission 1 further includes angled gear 35 which is free spinning concentrically about crankshaft 20 by way of a bearing 37. Gear 35 includes an angled gear surface 39 having a series of teeth or grooves (not shown) milled or machined into angled gear surface 39 in a particular orientation. Gear 35 further includes a clutch pad 41 on an opposed back surface, the clutch pad 41 sized and oriented to abut clutch pad 27 when drive clutch 22 is forcibly moved thereto by shifting linkage 31.

Figure 4:
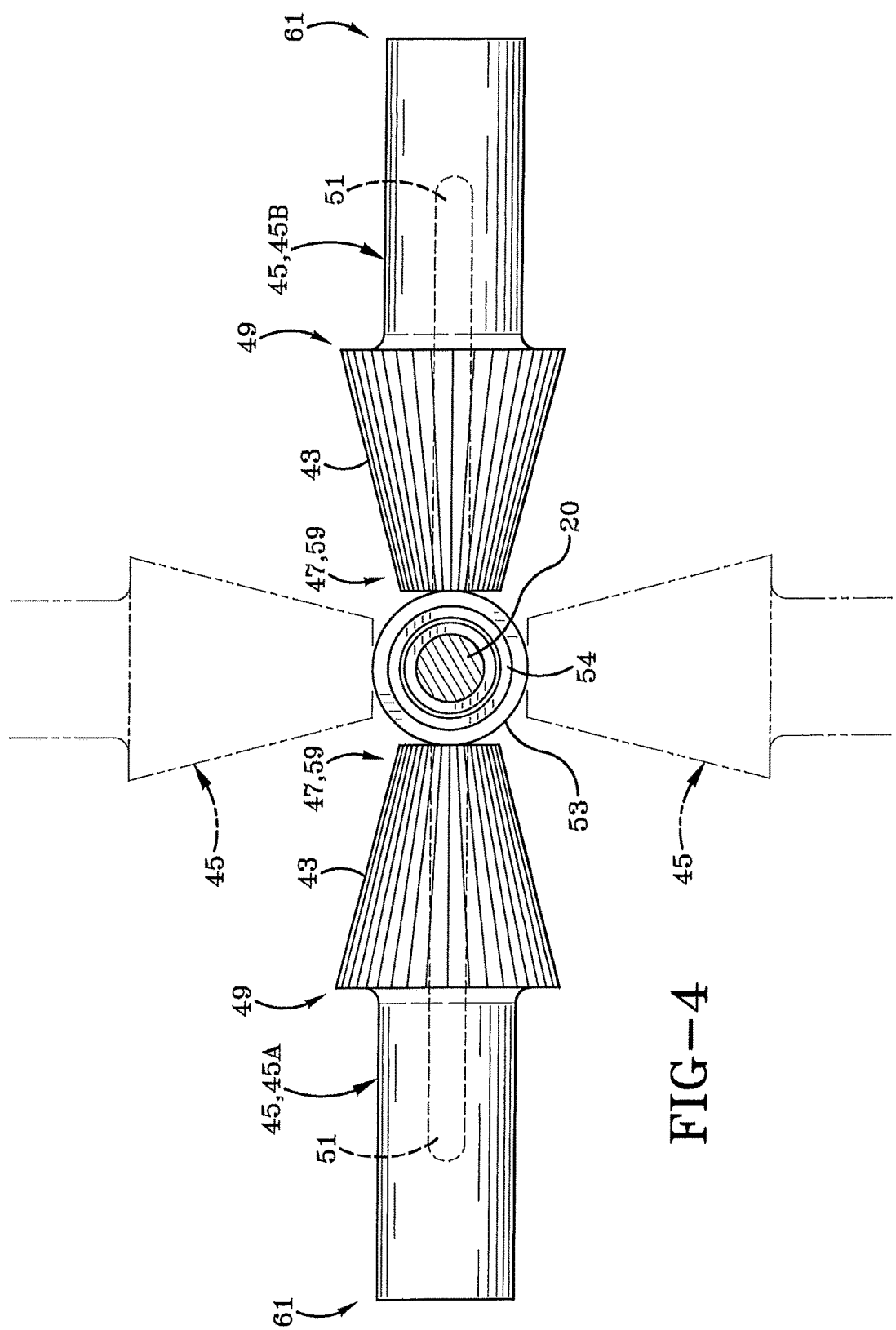
FIG. 4 is a view taken along line 4-4 of FIG. 2.

As shown in FIG. 2 and FIG. 4, angled gear surface 39 abuts a similarly angled gear surface 43 having complementary teeth of a cone gear 45. FIG. 2 and FIG. 4 illustrate two cone gears 45, shown as 45A and 45B. Each head of cone gear 45 includes a top portion 47 and a spaced apart bottom portion 49, with angled gear surface 43 extending therebetween. As shown in FIG. 2, a stabilizing rod 51 extends from within the first cone 45A into the next cone 45B. A sleeve 53 contacts the stabilizing rod 51 external to each cone gear 45 proximate top portion 47. Sleeve 53 includes a bearing 54 receiving shaft 20 therethrough. Each cone gear 45 includes an internal cavity 55 which houses a portion of stabilizing rod 51 as well as a spring 57. Cone gear 45 is aligned concentrically with rod 51. Helical compression coil spring 57 is braced at one end by a bearing 58 and at the opposite spaced apart end by a driveshaft 63A or 63B, respectively. Inasmuch as cone gear 45 extends from a first end 59 to a second end 61, a splined head 64A or 64B, respectively, of driveshaft 63A or 63B is received within a splined opening 67 of cone gear 45 proximate second end 61. In addition to splined head 64A or 64B, driveshaft 63A or 64B includes shaft 65A or 65B respectively extending outwardly away therefrom. Second end 61 of cone gear 45 is free to move within an opening 68 defined by housing 73A or 73B and connected to a bearing 66 within an opening formed in casing 33. This orients spline head 64A or 64B of driveshaft 63A or 63B, respectively, such that cone gear second end 61 moves about splined head 64A or 64B as cone gear 45 travels back and forth within splined opening 67. Spring 57 is biased to push cone gear 45 against and away from splined head 64A or 64B towards crankshaft 20. Thus, each cone gear 45 is biased towards one another and away from driveshaft 63A or 63B, respectively.

As shown in FIG. 2, each cone gear 45A and 45B includes a splined connection with the corresponding driveshaft 63A and 63B. Driveshaft 63A is entirely surrounded by a housing 73A and shaft 65A is capped off by bearing 69. Thus, driveshaft 63A is a placeholder or an auxiliary mechanism power take off (PTO) for imparting rotation into a piece of equipment. Conversely, housing 73B includes an opening 75 defined thereby, where shaft 65B of driveshaft 63B extends outwardly therethrough and into a sleeve 71. Shaft 65B extends outwardly away from housing 73B and imparts a variable speed rotation to drive wheels 7 in any commonly understood methods used in the art.

Figure 2A:
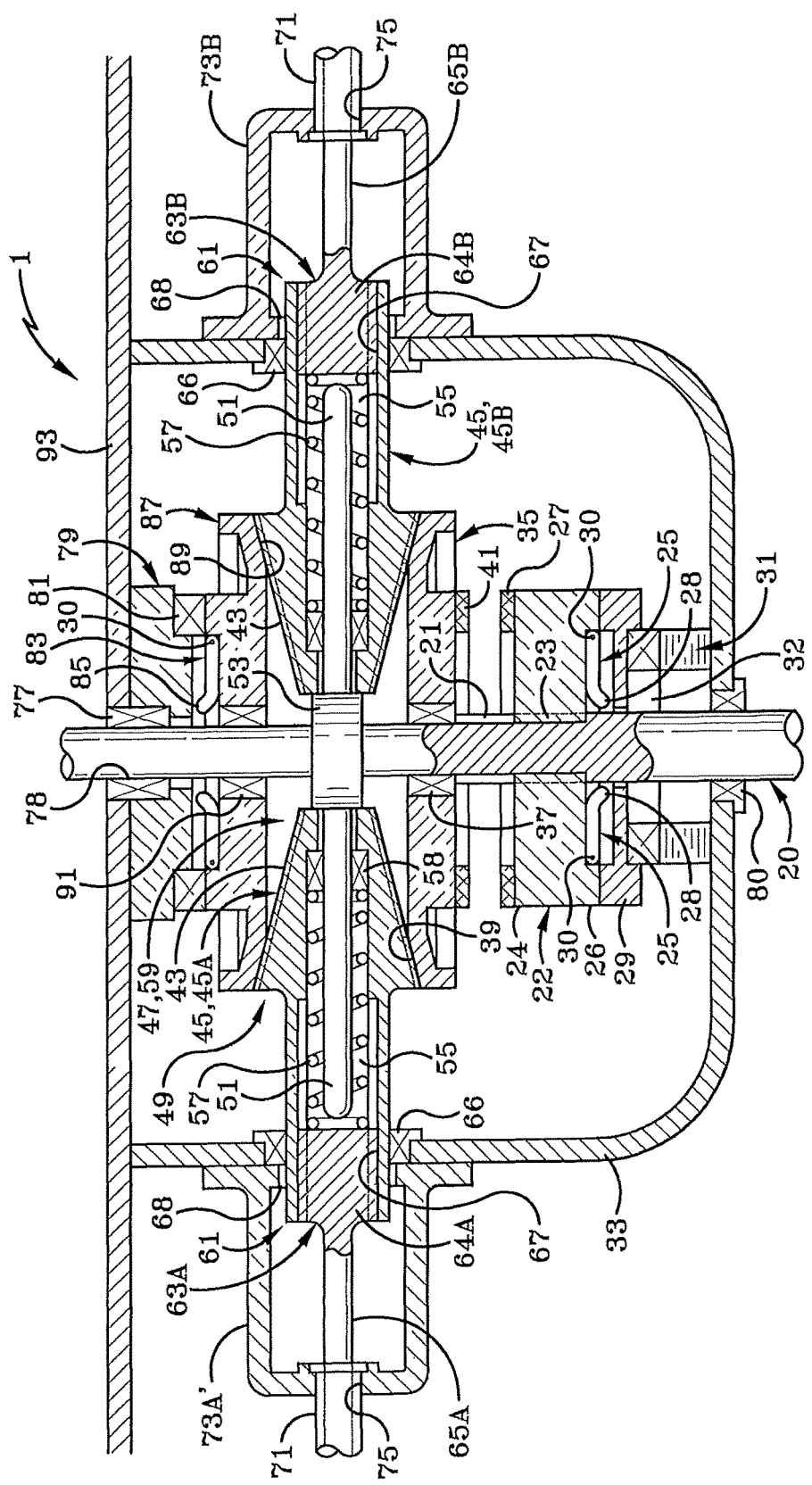
FIG. 2A is an alternative embodiment including a second driveshaft.

As depicted in FIG. 2A, in the alternative event that transmission 1 is used with another piece of equipment instead of a motorcycle, such as a tractor or a four-wheeled vehicle, the auxiliary smooth shaft 65A may also extend through housing 73A' to be received in another auxiliary mechanical system for use in driving that system.

As shown in FIG. 2, transmission 1 includes a free spinning brace gear 87 on the opposite side of cone gear 45 from angled gear 35. Free spinning brace gear 87 is concentric with crankshaft 20 shown with an angled gear surface 89 which is machined with gear teeth and oriented to mate with angled gear surface 43 of cone gear 45. Brace gear 87 further includes a plurality of fingers 83, with each finger 83 including a tip 85 and each finger 83 movable from a first position (FIG. 2) to a second position (FIG. 11) via pivot 30. Brace gear 87 is fitted around a bushing 91, which is configured to receive crankshaft 20 therethrough. Brace gear 87 and bushing 91 is movable axially along crankshaft 20, however, brace gear 87 abuts a bearing 81 in a resting or neutral position. Bearing 81 is secured to a base 79, which is set against a side plate 93. Side plate 93 defines an opening 78 therethrough, wherein a bushing 77 resides to surround crankshaft 20 as crankshaft 20 passes through side plate 93. At the other side of the casing 33, shaft 20 extends through bushing 80 in casing 33.

Figure 3:
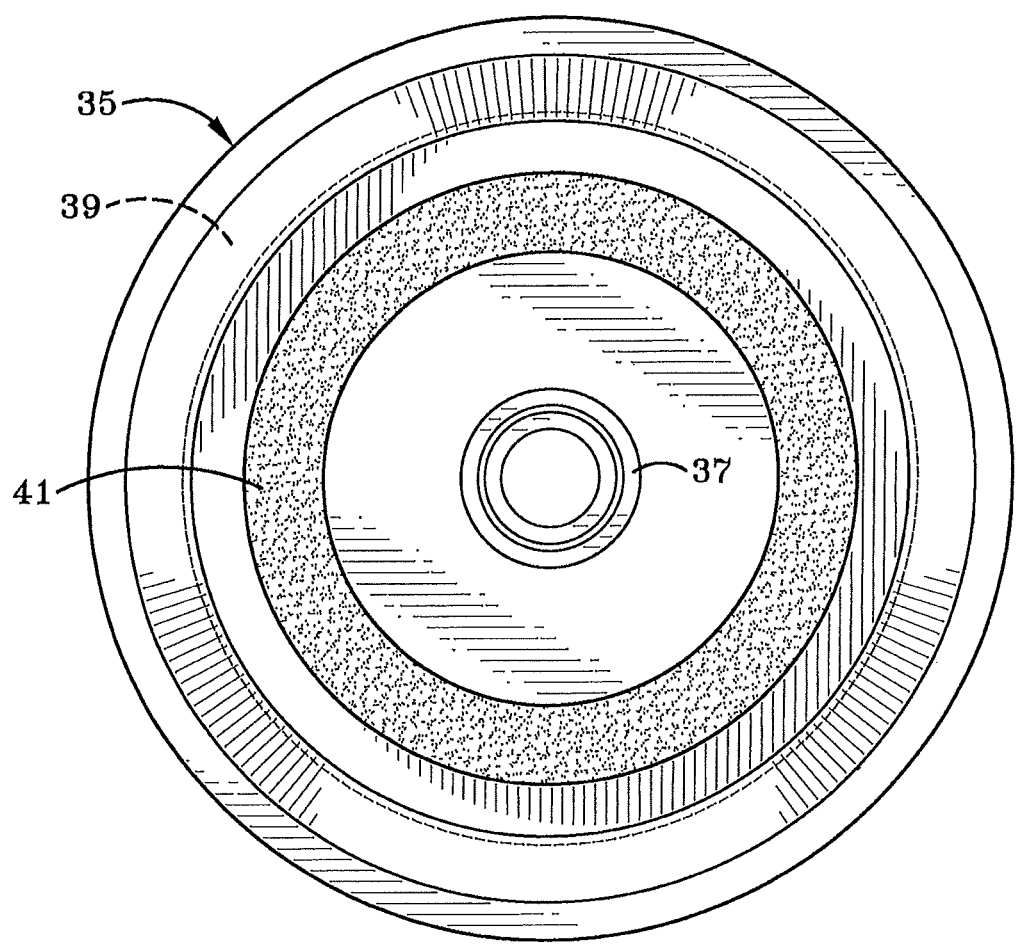
FIG. 3 is a view taken along line 3-3 of FIG. 2 with the driveshaft removed for illustrative purposes.

As depicted in FIG. 3, angle gear 35 is generally circular receiving crankshaft 20 concentrically therethrough when viewing the primary face. Note, Crankshaft 20 has been removed from FIG. 3 for illustrative purposes indicated that bearing 37 aligns with a smooth portion of crankshaft 20.

Clutch pad 41 extends annularly about crankshaft 20 and is preferably concentric therewith attached to gear 35 facing pad 27 on drive clutch 22. FIG. 3 also depicts bearing 37 configured to extend around a smooth portion of crankshaft 20. However, as depicted in the other figures, crankshaft 20 includes a splined portion defined by splines 21 along which clutch 22 travels (See FIG. 2). Clutch 22 does not travel beyond splined portion 21 but may abut bearing 37 at a location where the splined portion terminates and the smooth portion of crankshaft 20 begins such that pad 41 engages pad 27.

As depicted in FIG. 4, left and right cone gears 45A, 45B each have stabilizing rod 51 centrally aligned therein and are configured to ridingly contact sleeve 53 which freely rotates about bearing 54 having crankshaft 20 extending concentrically therethrough. Cone gears 45 slide axially relative stabilizing rod 51 via bearing 58 (FIG. 2). It is also to be understood that while two cone gears 45A, 45B are depicted clearly another set of cone gears depicted in dot-dash line and labeled with the phantom reference numeral 45 may be included in an alternative embodiment of the present disclosure configured to drive third and fourth auxiliary mechanisms respectively.

Figure 5:
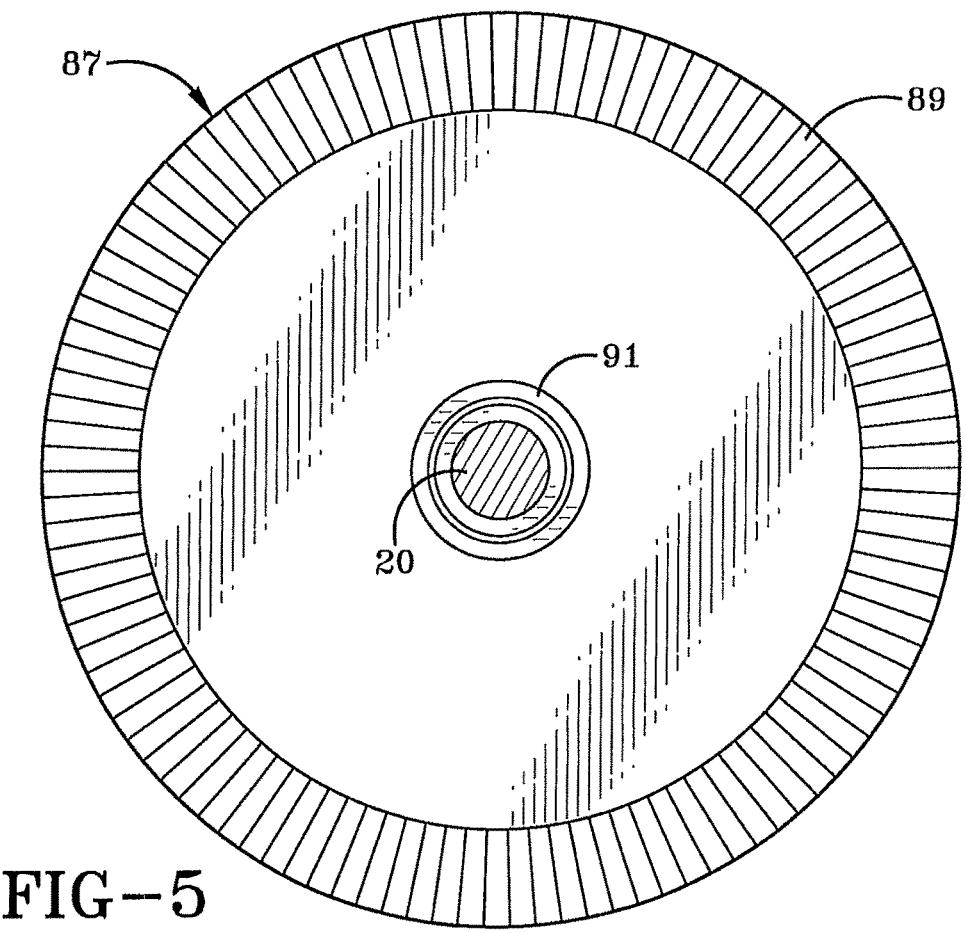
FIG. 5 is a view taken along line 5-5 of FIG. 2.

As depicted in FIG. 5, the geared tooth surface 89 of gear 87 is depicted as being a generally circular member rotating concentrically about crankshaft 20 via bushing 91. Gear surface 89 on gear 87 extends from the circular outer edge inwardly towards crankshaft 20 at a tapered angle complimentary to gear surface 43 (FIG. 2).

Figure 6:
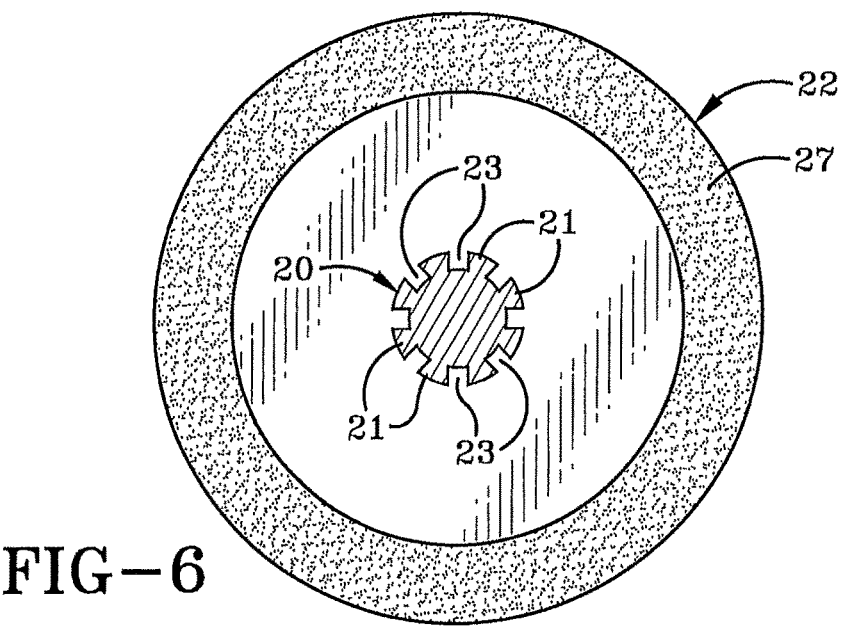
FIG. 6 is a view taken along line 6-6 of FIG. 2.

As depicted in FIG. 6, clutch 22 includes clutch pad 27 disposed annularly on inner portion 24 (FIG. 2). Clutch 22 includes a generally circular cross-section and is configured to mate with crank-shaft 20 via complimentary splines 23 formed in clutch 22 and splines 21 formed on crankshaft 20. Splines 21, 23 interlock to form a dovetail joint connection.

Figure 7:
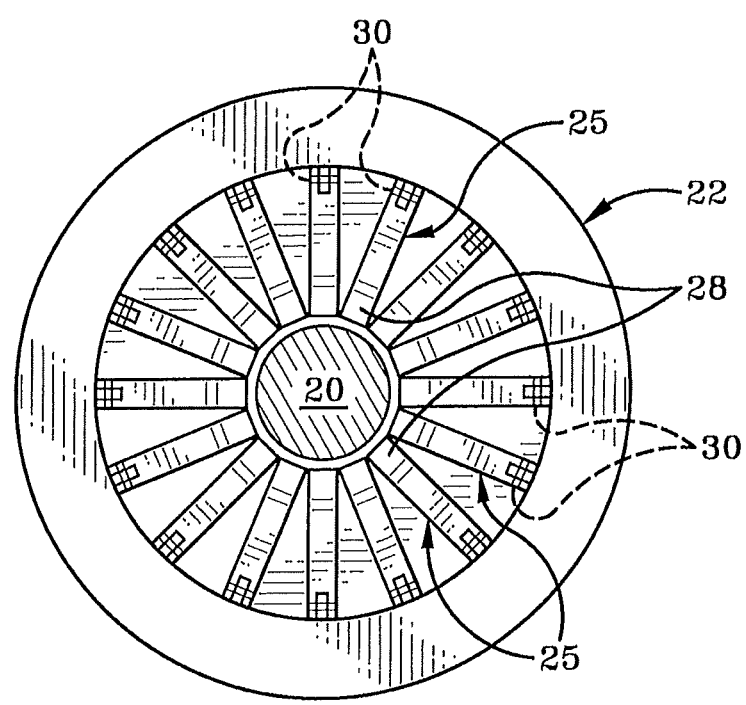
FIG. 7 is a view taken along line 7-7 of FIG. 2.

As depicted in FIG. 7, a plurality of fingers 25 extend inwardly towards crankshaft 20 from pivot connections 30 spaced circumferentially about clutch 22. Fingers 25 on clutch 22 are configured to pivot about pivot connection 30 under centrifugal forces as clutch 22 rotates in unison with crankshaft 20.

Figure 8:
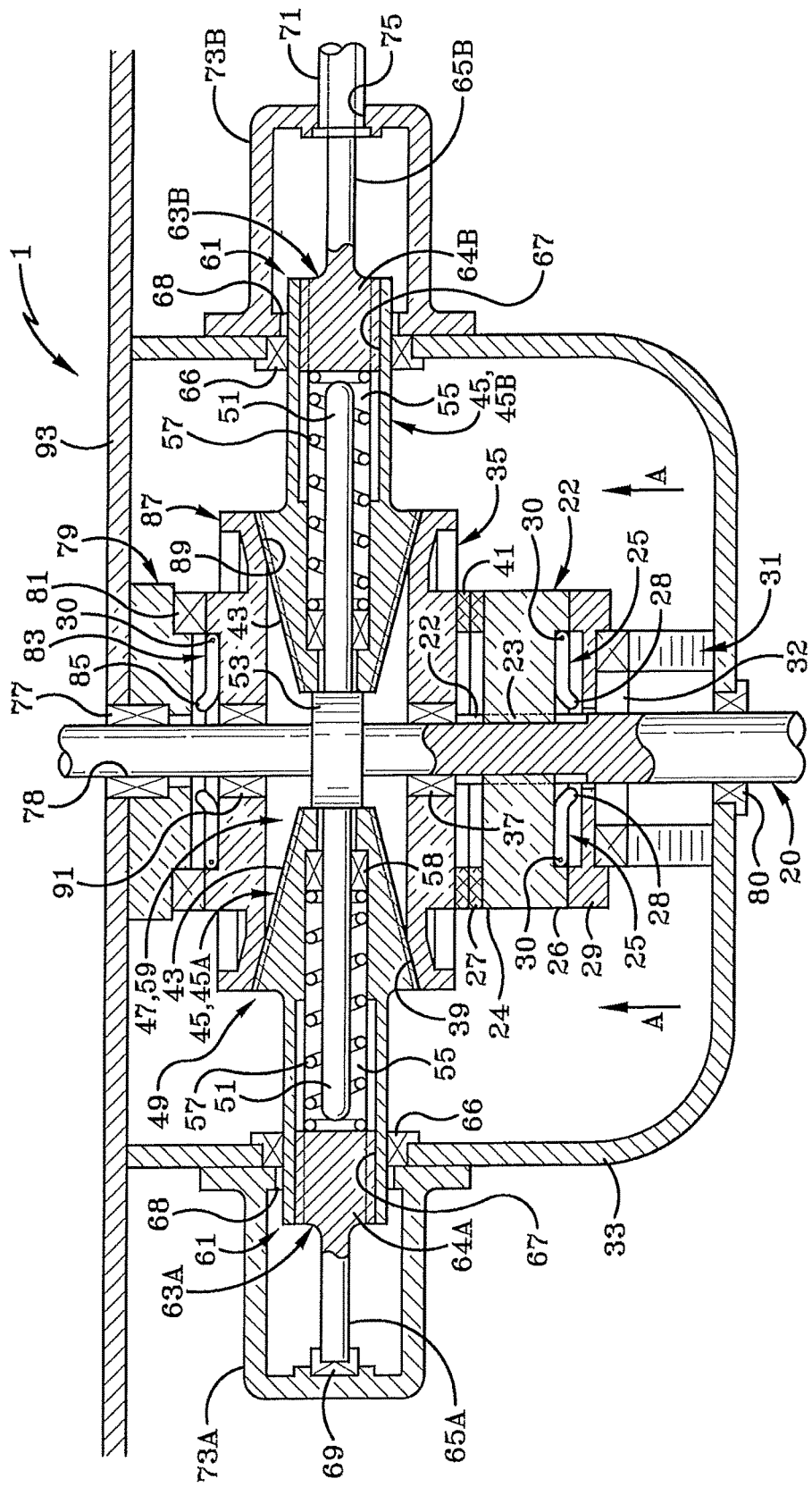
FIG. 8 is an operational cross-sectional view taken along line 2-2 of FIG. 1, showing a drive clutch moving in the direction of arrow A.

In operation and with primary reference to FIG. 8, crank shaft 20 is rotated about its longitudinal axis in a conventional manner as understood by the ignition of radial engine 5. In order to turn the rotational movement of crank shaft 20 into lateral movement of motorcycle 3, some components within transmission 1 interact with each other. Shifting linkage 31 is urged in a conventional manner from the motorcycle rider in the direction of arrow A. As shifting linkage 31 moves in the direction of arrow A, drive clutch 22 moves in a similar direction such that clutch pad 27 engages clutch pad 41 on gear 35. Drive clutch 22 is moveable from a resting position to an abutting position, wherein the drive clutch does not abut the gear plate 35 in the resting position and wherein the drive clutch 22 abuts the gear plate 35 in the abutting position.

Figure 9:
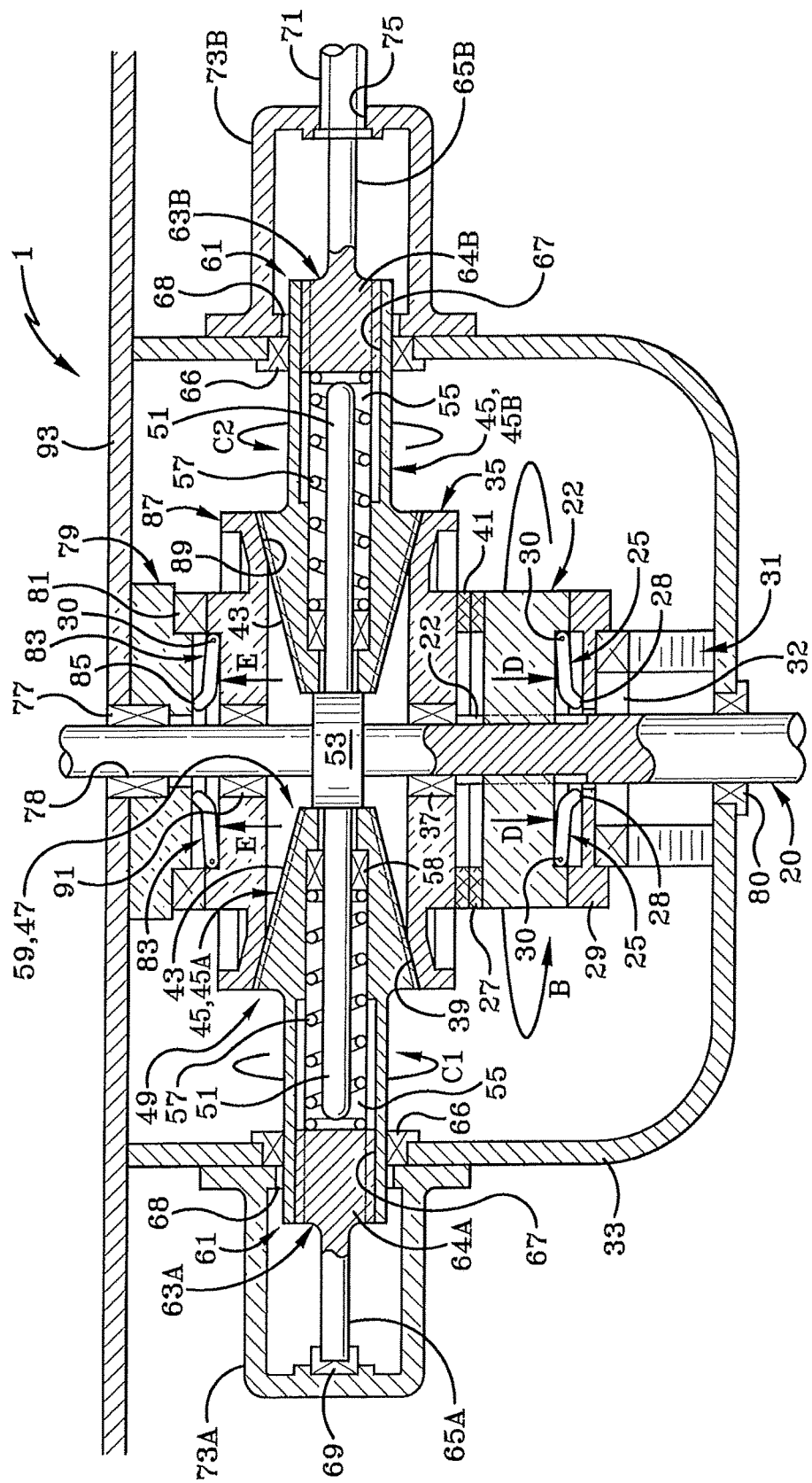
FIG. 9 is a similar view thereof, showing the drive clutch engaged with a gear and a plurality of fingers extending from the drive clutch moving in the direction of arrows D.

In operation and with respect to FIG. 9, as crankshaft 20 rotates in the direction of arrow B, angled gear plate 35 mateably engages first cone gear 45A to rotate in the direction of arrow C1. In the mated position, the angled teeth 39 on gear 35 interlock in a releasably driveable manner with teeth 43 on cone gear 45. As angled gear plate 35 is rotating in the direction of arrow B, a second coned gear 45B rotates in the direction of arrow C2, which is opposite indicated by arrow C1.

Figure 10:
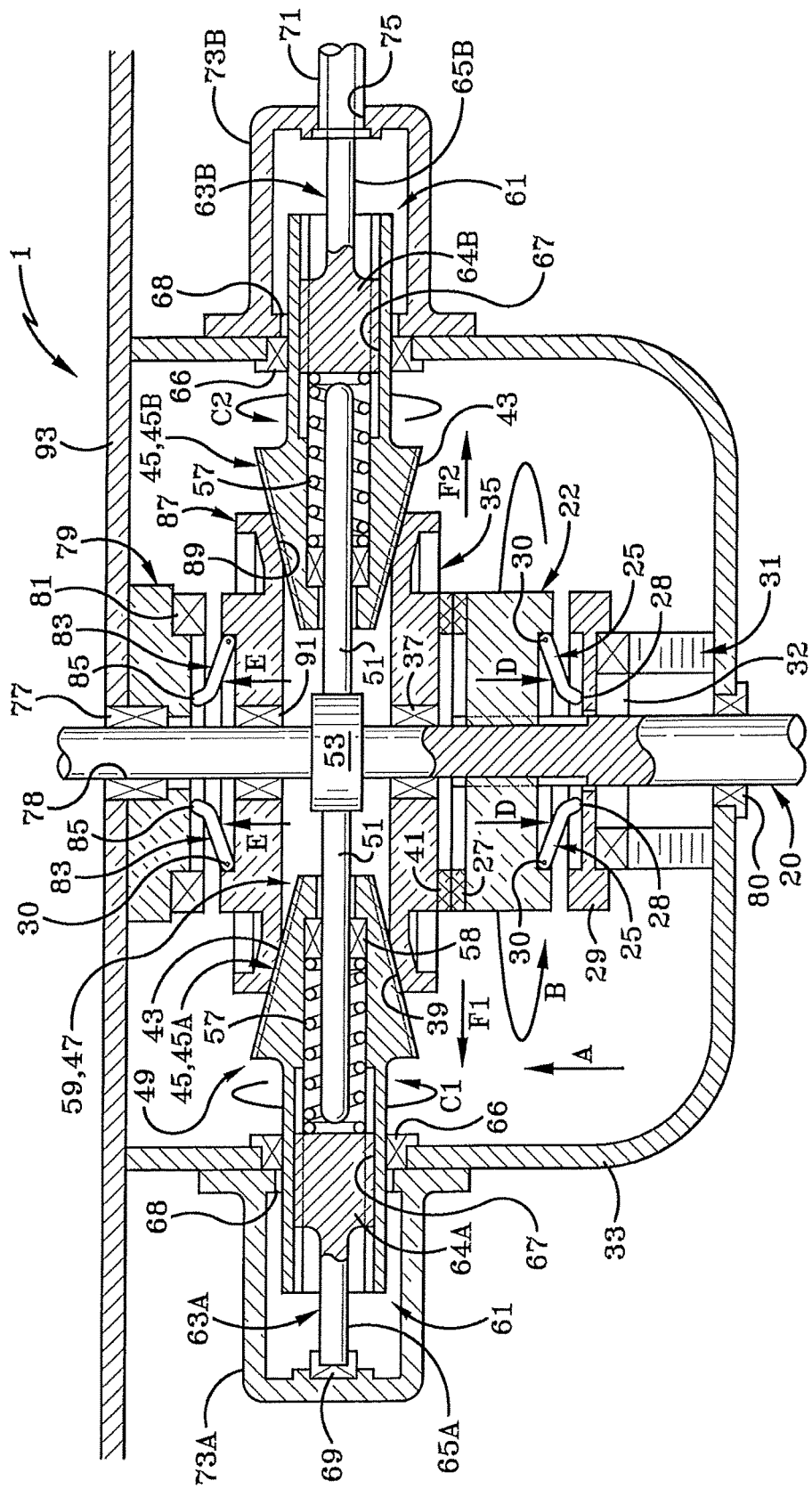
FIG. 10 is a similar view thereof with the fingers further extending.

As depicted in FIG. 10, when the drive clutch 22 is in the abutting position, as depicted in FIG. 9, the plurality of fingers 25 secured to the drive clutch move under centrifugal force from a first position to a second position via pivot connection 30. The fingers 25 are in a first position at a first speed and the second position at a second speed. Fingers move in the direction of arrow D as motorcycle is moving from the first speed to the second speed. The extension of fingers 25 in the direction of arrow D ensure contact of geared surface 39 to geared surface 43. The rotation of cone gear 45B in the direction of arrow C2 coupled to driveshaft 65 causes similar rotation in shaft 65B. The shaft 65B on driveshaft 63B drives motorcycle forward through a connection with a hub-less cage located at the rear end of the motorcycle 3.

In operation and with continued reference to FIG. 10, similar to fingers 25 that move in the direction of arrow D via pivot connection 30, fingers 83 on spinning brace gear 87 may move in the direction of arrow E via another pivot connection 30 as crankshaft 20 moves between the first speed and the second speed. It is contemplated that the fingers on brace gear 87 that move in the direction of arrow E will be displaced a distance similar to that of fingers 25 moving in the direction of arrow D but in the opposite direction.

Figure 11:
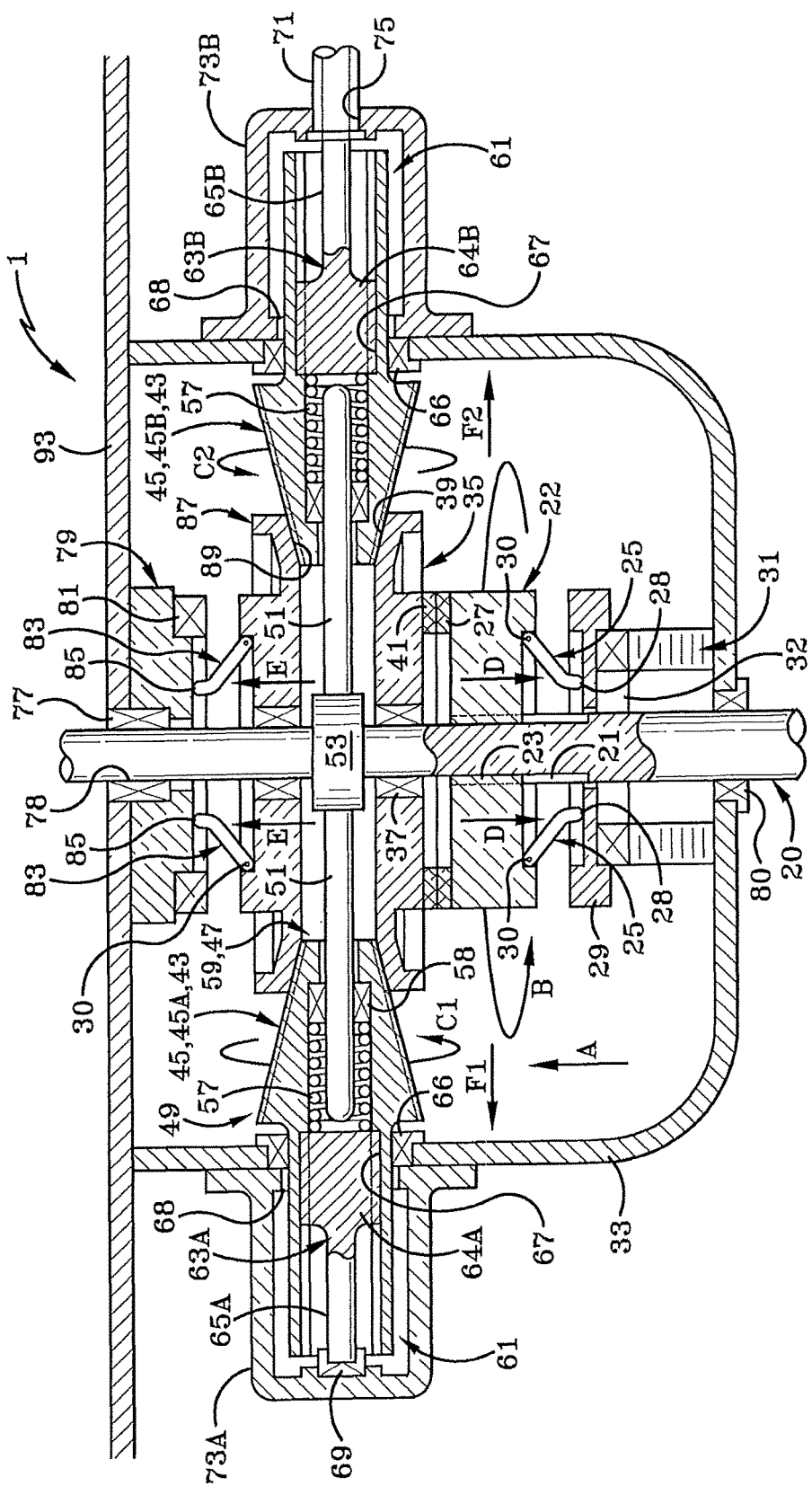
FIG. 11 is a similar view thereof with the fingers fully extended.

In operation with continued reference to FIG. 10 and FIG. 11, as the fingers outwardly project and are displaced in the direction of arrows D and E respectively, the two cone gears move outwardly in the direction of F1 and F2 respectively. As the number of revolutions of crank shaft 20 increases in the direction of arrow B, the spring 57 compresses permitting cone gears to displace outwardly in the directions of F1 and F2 respectively to vary the gear ratio of the power extending through the transmission 1 imparted to the rear drive wheel through driveshaft 63B. The gear ratio varies because the diameter of geared surface 43 on 45A and 45B changes as coned gears 45A, 45B move in the direction of arrow F1, F2, respectively.

Further, as fingers 25, 83 move via pivot connection 30 in the directions of arrows D and E, respectively, drive clutch 22 moves in the direction of arrow A along splines 21. It is further contemplated that as the rotation or revolutions per minute (rpm) of cranks shaft 20 in the direction of arrow B increases, the angled gear 35 moves inwardly closer to adjacent gear 87 while compressing spring 57 to move tapered gear surface 39 adjacent the first end of cone gear 45. This results in an increased rpm for cone gears 45A, 45B which increases the rpm for driveshaft 63B which cause a faster rotation of rear drive wheel 7 to move the motorcycle 3.

Additionally the term motorcycle 3 used herein refers to any type of saddled vehicle in which the operate rides free of an enclosed cabin regardless of how many wheels are touching the ground.

In the foregoing description, certain terms have been used for brevity, clearness, and understanding. No unnecessary limitations are to be implied therefrom beyond the requirement of the prior art because such terms are used for descriptive purposes and are intended to be broadly construed.

While the present disclosure has been described in connection with the preferred embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the recitation of the appended claims.

What is claimed:

1. A motorcycle comprising:
   a motorcycle frame;
   at least two ground engaging wheels operatively connected to the motorcycle frame;
   a saddle seat supported by the motorcycle frame adapted to be straddled by a riding motorcycle operator;
   a footrest beneath the seat;
   a steering mechanism operatively connected to the motorcycle frame, wherein the steering mechanism supports a throttle and a clutch lever;
   a radial engine supported by the motorcycle frame to power at least one of the ground engaging wheels; and
   a continuously variable transmission (CVT) supported by the motorcycle frame and coupled to the radial engine providing a variety of effective gear ratios.

2. The motorcycle of claim 1, further comprising:
   a crankshaft connecting the radial engine to the CVT;
   wherein the CVT includes a first cone shaped gear having a first end and a second end.

3. The motorcycle of claim 2, wherein the CVT further includes a driveshaft connected to the second end of the cone shaped gear.

4. The motorcycle of claim 2, wherein the CVT further includes a gear plate concentric with the crankshaft and having an angled geared surface configured to mate with the first cone shaped gear and an opposed back surface.

5. The motorcycle of claim 2, wherein the CVT further includes a drive clutch concentrically connected to the crankshaft, wherein the drive clutch moves from a rest position to an abutting position.

6. The motorcycle of claim 5, wherein the crankshaft extends centrally through the drive clutch to rotate the drive clutch about a crankshaft axis at least at a first speed and a second speed.

7. The motorcycle of claim 2, wherein the CVT further includes a plurality of fingers moveable from a first position to a second position, wherein the fingers are in the first position at a first speed, and wherein the fingers are in the second position at a different second speed.

8. The motorcycle of claim 2, wherein the CVT further comprises:
   a second cone shaped gear having a first end and a second end aligned with the crankshaft, wherein the second cone gear is positioned on an opposite side of the crankshaft than the first cone shaped gear.

9. The motorcycle of claim 2, wherein the CVT further comprises a brace gear on an opposite side of the first cone shaped.

10. The motorcycle of claim 9, wherein the brace gear comprises a plurality of fingers thereon and each finger movable from a first position to a second position about a pivot.

11. The motorcycle of claim 2, wherein the CVT further comprises a fixed side plate defining an opening and the crankshaft extending therethrough.

12. The motorcycle of claim 2, wherein the CVT further comprises:
    a top portion on the first cone shaped gear defining the first end and a spaced apart bottom portion with angled gear surface extending therebetween.

13. The motorcycle of claim 2, wherein the CVT further comprises:
    a sleeve concentric with the crankshaft and spaced apart from a gear plate; and
    a stabilizing rod connected to the sleeve extending centrally through the first cone shaped gear.

14. The motorcycle of claim 1, wherein the at least two ground engaging wheels are a hubless configuration.

15. The motorcycle of claim 1 that is free of an enclosed cabin.

16. A method comprising:
    providing a motorcycle having a radial engine supported by a frame and having a continuously variable transmission (CVT) connected to the radial engine, wherein the motorcycle also includes a saddle seat adapted to support a riding operator and a footrest beneath the saddle seat, and a steering mechanism, wherein the steering mechanism supports a throttle and a clutch lever;
    effecting the radial engine by actuating the throttle on the steering mechanism;
    engaging the continuously variable transmission by actuating the clutch lever on the steering mechanism; and
    driving the motorcycle forward.

17. The method of claim 16, further comprising:
    urging shift-control linkage with a lever adjacent the footrest.

18. The method of claim 16, further comprising:
    driving the motorcycle from a first speed to a different second speed, wherein a plurality of fingers pivotably attached to a gear plate pivot from a first position to a second position as the motorcycle is driven from the first speed to the second speed.

19. The method of claim 16, further comprising:
    rotating a driveshaft operatively connected to the CVT and operatively connected with a hubless cage located at the rear end of the motorcycle.

20. The method of claim 16, further comprising:
    revolving a crank shaft, wherein as the crank shaft revolutions increases, a first cone shaped gear in the CVT is outwardly displaced to vary the CVT gear ratio.

* * * * *